UNITED STATES PATENT OFFICE.

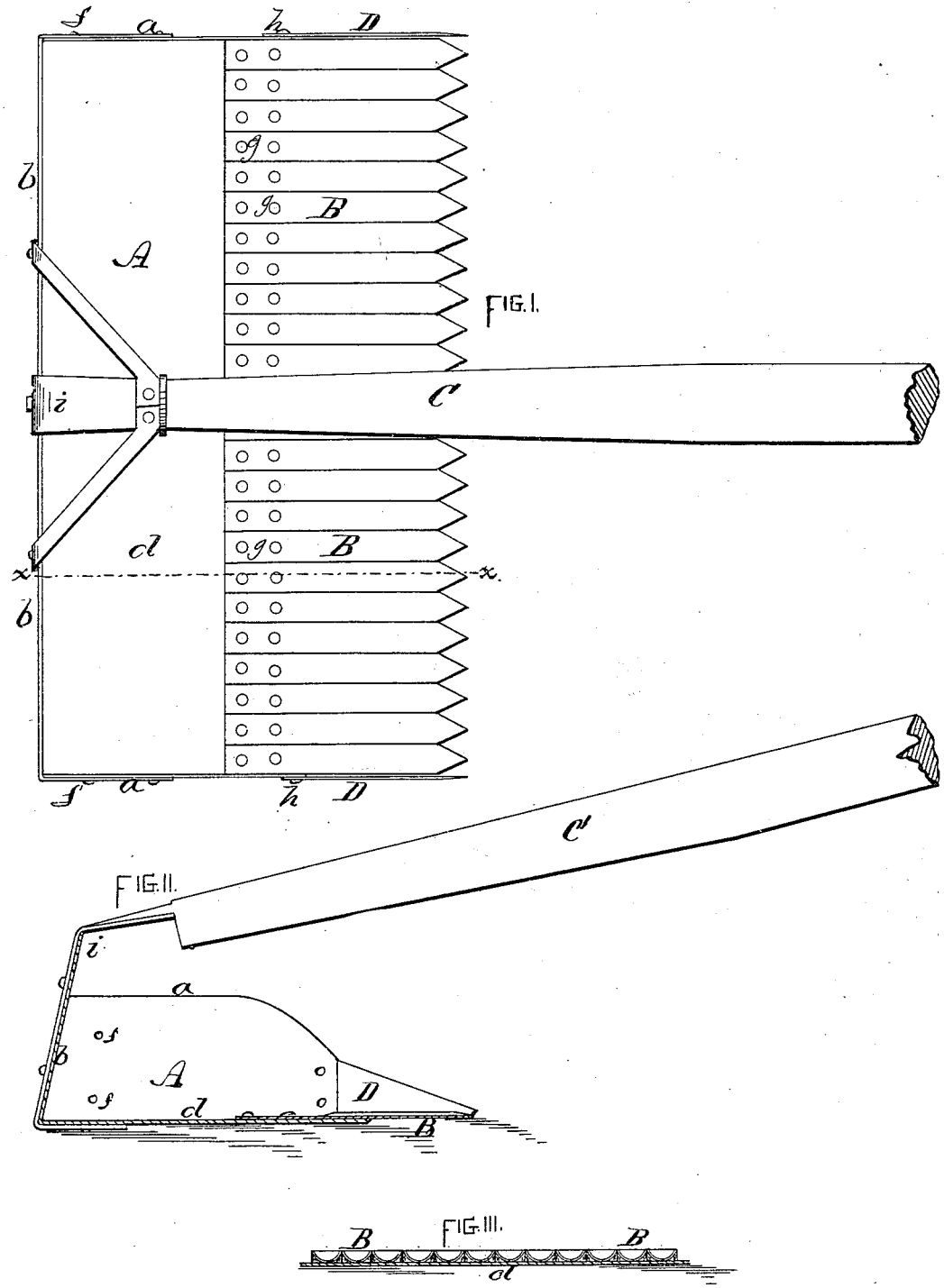

JOSEPH R. SYMMES, OF HAMILTON, OHIO.

IMPROVEMENT IN MACHINES FOR GATHERING GRASS-SEED.

Specification forming part of Letters Patent No. 167,280, dated August 31, 1875; application filed April 28, 1875.

*To all whom it may concern:*

Be it known that I, JOSEPH R. SYMMES, of Hamilton, in the county of Butler and State of Ohio, have invented a new and Improved Instrument for Gathering Blue-Grass and Red-Top Seed; and I do hereby declare that the following is a full and exact description thereof, reference being had to the accompanying drawings, making a part of this specification—

Figure 1 being a top view of the instrument; Fig. 2, a vertical section thereof, in a plane indicated by the line $x\ x$, Fig. 1; Fig. 3, a detail view of a part of the instrument.

Like letters designate corresponding parts in all of the figures.

My invention consists in an instrument to be used by hand for drawing through the standing ripe blue-grass or red-top, wherever it may grow in small patches among other crops, or near fences where machines could not operate, and thereby gather and separate the seed from the stalks, and save it for use or for sale.

The instrument consists essentially of a receptacle, A, made close at the sides, back, and bottom, and open in front and at the top; of teeth B B, riveted or otherwise secured to the front part of the receptacle bottom, and projecting forward therefrom, in contact or in close proximity to one another; and of a handle, C, by which to lift and operate the instrument.

The receptacle A I make of sheet-steel, this being the best material for the purpose of which I have knowledge. It is made of a single piece of the sheet metal, the sides $a\ a$ and back $b$ being turned up from the part of the sheet which forms the bottom $d$ thereof, and the corners between the sides and back being joined by lapping the surplus metal either over the sides or over the back, as at $f\ f$, and riveting together.

The teeth B B are made of sheet-steel, so as to be elastic, and yet sufficiently strong and firm. They are made concave on the upper side, as seen in Figs. 2 and 3, and are riveted at $g\ g$ to the front edge of the bottom $d$ of the receptacle, so as to project directly forward in actual contact with one another, or almost in contact, the forward ends thereof being tapered to a point, as shown, so that the stalks of the grass will be gathered between them. Outside of the teeth two side guards, D D, project forward from the sides $a\ a$ of the receptacle, being preferably made of separate pieces of sheet-steel for convenience and economy of construction, and riveted to the receptacle, as shown at $h\ h$, though they might be in one piece with the receptacle. The blue-grass or red-top stalks are also gathered between the side guards and the outer teeth B B.

The handle C is secured by a flange or shank, $i$, to the back side $b$ of the receptacle, and extends from the upper edge thereof forward and upward over the instrument to a proper length, about as the handle of a hand-rake.

This instrument, simple and light as it is, is held in the hands, to be thrust out over the blue-grass or red-top, and the teeth made to engage with the grass below the heads and above the leaves or blades thereof, where the stalks are small and easily pass between the teeth, which spring apart up or down sufficiently to allow the fine stalks to pass. The instrument is then drawn toward the operator, and the seeds of grass are cleanly stripped from the stalks. The operation is repeated, the instrument being used somewhat in the manner of a hand-rake. As the seed is gathered by the teeth, it slides back in the concave upper sides thereof into the receptacle, which, when full enough, is emptied of its contents into a basket or bag.

What I claim as my invention, and desire to secure by Letters Patent, is—

A hand-instrument for gathering blue-grass and red-top seed, composed of a receptacle, A, elastic teeth B B, and handle C, constructed to operate substantially as and for the purpose herein specified.

JOSEPH R. SYMMES.

Witnesses:
J. S. BROWN,
J. TYLER POWELL.